(12) United States Patent
Huck

(10) Patent No.: US 10,906,560 B2
(45) Date of Patent: Feb. 2, 2021

(54) INTEGRATED MANDREL VEHICLE RESTRAINT WITH PEDAL TENSIONER

(71) Applicant: Trinity Rail Group, LLC, Dallas, TX (US)

(72) Inventor: Kenneth W. Huck, Fairview, TX (US)

(73) Assignee: TRINITY RAIL GROUP, LLC, Dallas, TX (US)

( * ) Notice: Subject to any disclaimer, the term of this patent is extended or adjusted under 35 U.S.C. 154(b) by 13 days.

(21) Appl. No.: 16/397,443

(22) Filed: Apr. 29, 2019

(65) Prior Publication Data

US 2019/0337536 A1 Nov. 7, 2019

Related U.S. Application Data

(60) Provisional application No. 62/665,058, filed on May 1, 2018.

(51) Int. Cl.
| | |
|---|---|
| *B60P 3/18* | (2006.01) |
| *B61D 3/18* | (2006.01) |
| *B61D 45/00* | (2006.01) |
| *B61D 3/16* | (2006.01) |
| *B60P 3/079* | (2006.01) |

(52) U.S. Cl.
CPC ............... *B61D 3/18* (2013.01); *B60P 3/079* (2013.01); *B61D 3/16* (2013.01); *B61D 45/001* (2013.01)

(58) Field of Classification Search
CPC .......... B61D 45/001; B61D 3/18; B61D 3/16; B60P 3/075; B60P 3/079; B65D 2585/6867; B60T 3/00
USPC ..................... 410/9–12, 19–23, 30
See application file for complete search history.

(56) References Cited

U.S. PATENT DOCUMENTS

| | | | | |
|---|---|---|---|---|
| 5,011,347 A | * | 4/1991 | Bullock | B60P 3/077 410/10 |
| 5,316,421 A | * | 5/1994 | Bullock | B60P 3/077 410/10 |
| 9,481,284 B2 | * | 11/2016 | Cencer | B60P 3/075 |

* cited by examiner

*Primary Examiner* — Stephen T Gordon
(74) *Attorney, Agent, or Firm* — Baker Botts, LLP

(57) ABSTRACT

An apparatus includes a mandrel assembly, an anchor, a strap, a winch, a first pedal, an advancer. The mandrel assembly is positioned on a first side of a tire of a vehicle and to couple to a track assembly of rail car. The anchor is positioned on a second side of the tire and to couple to the track assembly. The strap assembly is coupled to the mandrel assembly and the anchor and wraps around the tire. The winch is coupled to the mandrel assembly. The winch includes a first sprocket. The advancer is coupled to the first pedal and engages the first sprocket such that, when the first pedal is pushed towards the winch, the advancer pushes the winch such that the winch and the mandrel assembly rotate in a first direction.

15 Claims, 6 Drawing Sheets

INTEGRATED MANDREL VEHICLE RESTRAINT WITH PEDAL TENSIONER

RELATED APPLICATIONS AND CLAIM TO PRIORITY

This application claims priority to U.S. Provisional Application No. 62/665,058 filed May 1, 2018 and titled "INTEGRATED MANDREL VEHICLE RESTRAINT WITH FOOT PEDAL TENSIONER," which is incorporated herein by reference.

TECHNICAL FIELD OF INVENTION

This disclosure relates generally to restraining a vehicle, and more particularly for restraining a vehicle with an integrated mandrel with a foot pedal tensioner.

BACKGROUND

Vehicle manufacturers often ship vehicles via railroad lines on single or multi-deck rail cars. Methods for restraining vehicles on industrial shipping routes are frequently employed to prevent injury to rail-line employees, and to prevent vehicles from being damaged from contact with rail equipment or other freight. Traditionally, these methods for restraining vehicles include a tie down system to secure a wheel of the vehicle to the deck of the transport. Sometimes, these tie downs include a chock and strap configuration for securing the tire of a vehicle in place on the shipping vessel.

Manufacturers are constantly improving vehicle designs in order to increase the performance and efficiency of their products. For example, vehicle manufacturers have been reducing the tire-to-fender clearance ratios of their vehicles in an effort to decrease aerodynamic drag and increase performance and fuel efficiency.

Sometimes, these design changes are incompatible with current shipping restraint mechanisms. For example, traditional chock and strap configurations may not be designed to effectively secure vehicles with low tire-to-fender clearance ratios. Further, on vehicles with low tire-to-fender clearance ratios, the tightening process on traditional restraint mechanisms may cause the chock body to interfere with and damage the vehicle's fender.

SUMMARY OF THE INVENTION

This disclosure contemplates an unconventional vehicle restraint system that offers improvements over conventional vehicle restraint systems. For example, the vehicle restraint system may include a release mechanism that releases when the vehicle and/or rail car sustain a sufficiently large impact force. By releasing the vehicle during these impacts, damage to the vehicle may be prevented. As another example, the vehicle restraint system may include pedals that can be used to secure and release a vehicle to a rail car. These pedals may be used instead of a tensioning key, which may get lost or may damage vehicles.

According to one embodiment, a vehicle restraint system includes a strap assembly configured to secure a tire of a vehicle to a track assembly. The vehicle restraint system also includes a mandrel assembly operable to be coupled to the strap assembly and configured to engage the track assembly. The vehicle restraint system also includes a locking mechanism coupled to the mandrel. The locking mechanism configured to selectively prevent rotation of the mandrel in one direction. The vehicle restraint system also includes a tensioner configured to rotate the mandrel and tighten the strap assembly around the tire of the vehicle.

According to another embodiment, an apparatus includes a mandrel assembly, an anchor, a strap, a winch, a first pedal, and an advancer. The mandrel assembly is positioned on a first side of a tire of a vehicle and to couple to a track assembly of rail car. The anchor is positioned on a second side of the tire and to couple to the track assembly. The strap assembly is coupled to the mandrel assembly and the anchor and wraps around the tire. The winch is coupled to the mandrel assembly. The winch includes a first sprocket. The advancer is coupled to the first pedal and engages the first sprocket such that, when the first pedal is pushed towards the winch, the advancer pushes the winch such that the winch and the mandrel assembly rotate in a first direction.

According to another embodiment, a method includes positioning a strap assembly on a portion of a tire of a vehicle and coupling a mandrel assembly to a track assembly of a rail car on a first side of the tire. The method also includes coupling an anchor to the track assembly on a second side of the tire and coupling the strap assembly to the mandrel assembly and to the anchor. The method further includes pushing downward on a first pedal to cause an advancer coupled to the first pedal to engage a first sprocket of a winch coupled to the mandrel assembly and to push the winch such that the winch and the mandrel assembly rotate in a first direction.

Other objects, features, and advantages of the present disclosure are apparent to persons of ordinary skill in the art in view of the following detailed description of the disclosure and the accompanying drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Preferred embodiments of the present invention, and their features and advantages, may be understood by referring to FIGS. 1-5, like numerals being used for corresponding parts in the various drawings.

Figure 1A:
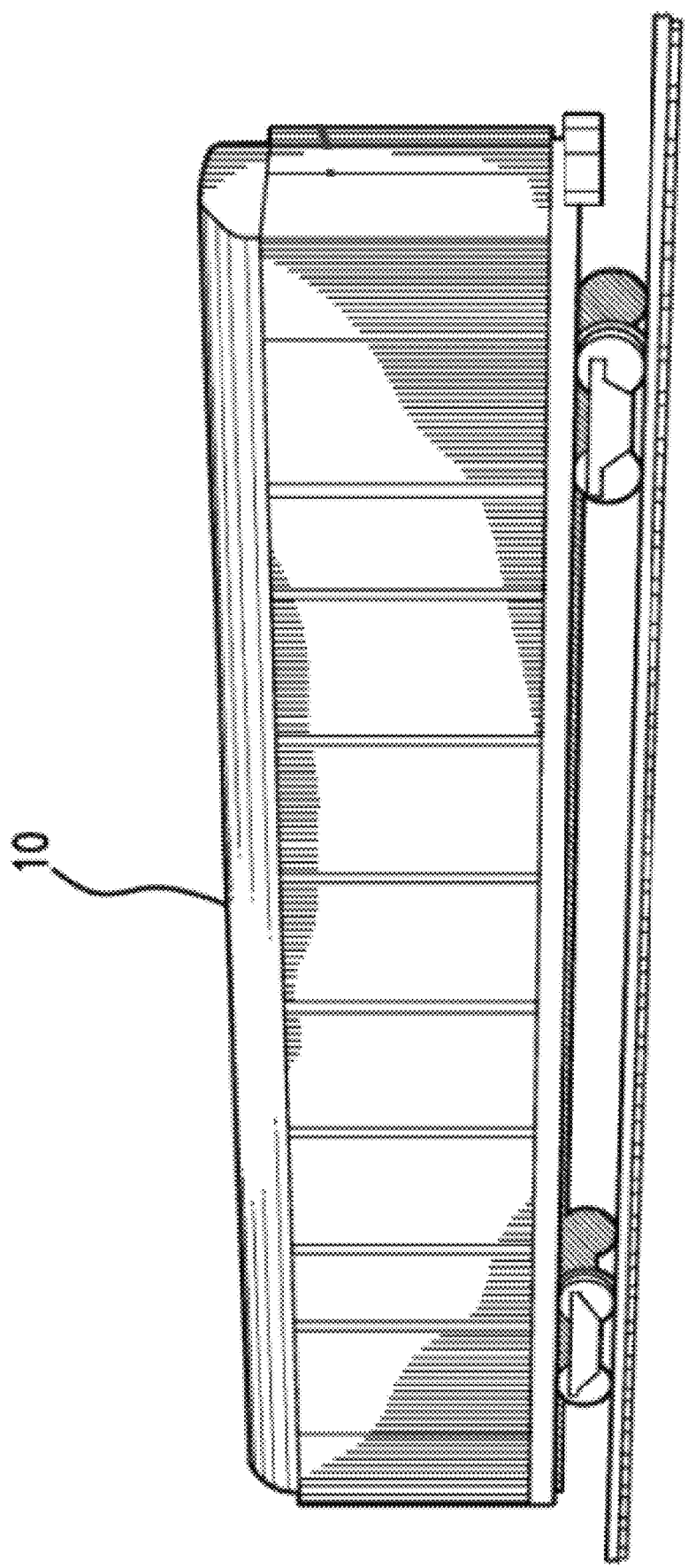
FIG. 1A illustrates a railway car, in accordance with certain embodiments.

FIG. 1A illustrates an example railway car 10. Railcar 10 may be used to transport vehicles and/or automobiles along tracks. These vehicles and/or automobiles may be secured to the interior of railway car 10 during transport.

Figure 1B:
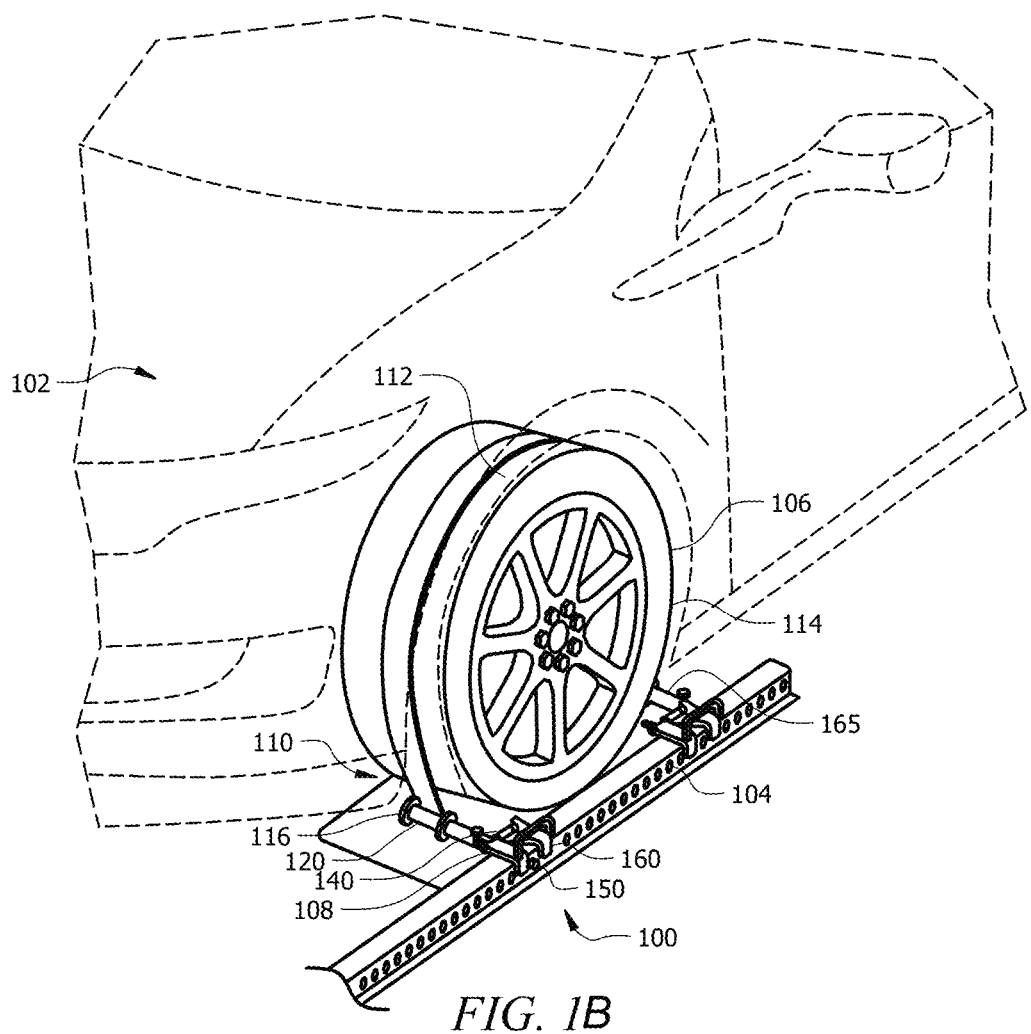
FIG. 1B illustrates an isometric view of a vehicle restraint system in a railway car, in accordance with certain embodiments.

FIG. 1B illustrates an isometric view of a vehicle restraint system 100 for restraining a vehicle with an integrated mandrel 120 and lock pin 150 within a railcar. In certain embodiments, vehicle restraint system 100 includes a strap assembly 110, a mandrel assembly 120, a winch 140, a lock pin 150, and an attachment assembly 160. Strap assembly 110 may wrap around a portion of tire 106 and attach to an assembly on a first side of wheel 106. Strap assembly 110 is secured to mandrel assembly 120, winch 140, lock pin 150, and attachment assembly 160. Attachment assembly 160 attaches lock pin 150 in place on chock track 104 when lock pin 150 is engaged with a hole on chock track 104. Attachment assembly 140 may be hinged and may rotate over the top of chock track 104 to secure vehicle restraint system 100 in place on chock track 104. Chock track 104 may be secured to a deck of a rail car. Thus, strap assembly 110, mandrel assembly 120, winch 140, and lock pin 150 may all be secured to the deck of the rail car via chock track 104. When strap assembly 110 is tightened against a portion of tire 106, vehicle 102 may be secured to the deck of a rail car (e.g., railcar 10). Anchor 165 is positioned behind tire 106 and couples to chock track 104. Anchor 165 may include an attachment assembly similar to attachment assembly 160. Strap assembly 110 wraps around tire 106 and is secured to anchor 165. Strap assembly 110 may then be tightened using mandrel assembly 120 to secure tire 106.

In certain embodiments, lock pin 150 is integrated into mandrel assembly 120 such that lock pin 150 and mandrel assembly 120 are coaxial. For example, mandrel assembly 120 may include a cylindrical steel rod with a strap assembly receiving section on a first side of mandrel assembly 120. The mandrel assembly may extend straight through a hole in track assembly 104 to attach the vehicle restraint system to track assembly 104. Thus, mandrel assembly 120 and lock pin 150 may be integrated into the same steel rod.

In certain embodiments, the coaxial nature of lock pin 150 and mandrel assembly 120 may refer to lock pin 150 and mandrel assembly 120 sharing a common axis of rotation. For example, mandrel assembly 120 may include a cylinder body. Mandrel assembly 120 may rotate on the axis of the cylinder body. Lock pin 150 may also include a cylinder body. Lock pin 150 may rotate on the axis of the cylinder body. In certain embodiments, mandrel assembly 120 cylinder body axis and lock pin 150 cylinder body axis are coaxial, such that mandrel assembly 120 and lock pin 150 share the same axis line.

In certain embodiments, mandrel assembly 120 may contain telescopic sections that vary in diameter. For example, mandrel assembly 120 may contain a second cylinder that is either narrower or wider in diameter than the strap assembly receiving section of mandrel assembly 120. In certain embodiments, these telescopic sections may fit through a track assembly 140 hole. For example, lock pin 150 may be narrower in diameter than mandrel assembly 120 strap receiving section. Lock pin 150 may telescopically fit within mandrel assembly 120, and may fit within a hole in chock track 104. In this example, lock pin 150 is coaxial with mandrel assembly 120 strap assembly receiving section.

As another example, a narrow cylinder lock pin 150 fits within a wider cylinder of mandrel assembly 120. The narrower diameter of lock pin 150 may fit inside track assembly 104. Lock pin 150 and mandrel assembly 120 may be fused and/or welded together.

In certain embodiments, an operator may rotate lock pin 150 in order to tighten strap assembly 110 around a portion 112 of tire 106. Lock pin 150 and mandrel assembly 120 may be coupled together such that the torque force received by lock pin 150 is transmitted to mandrel assembly 120. Mandrel assembly 120 strap assembly receiving section may rotate to tighten strap assembly 110 around tire 106 of vehicle 102.

In certain embodiments, strap assembly 110 is tightened by rotating an end of lock pin 150 that extends beyond a second side 112 of chock track 104. As lock pin 150 is rotated, the torque force is transferred to mandrel assembly 120 that tightens strap assembly 110 around a portion of tire 106. In certain embodiments, strap assembly 110 includes cleats which may fit inside the treads of tire 106. Such cleats may provide traction between tire 106 and a belt of strap assembly 110 when the vehicle shifts/changes positions in the transport. Cleats may also translate forces between strap assembly 110 and tire 106.

In certain embodiments, a winch assembly configured on mandrel assembly 120 locks the tightening force in place. For example, the tightening force may be locked in place by ratchet pawls that interlock with winch assembly 140 gear.

In certain embodiments attachment assembly 160 couples vehicle restraint system 100 in place on chock track 104. For example, the illustration in FIG. 1 shows a hinged attachment assembly 160 engaged with a first and second side of chock track 104. At least a portion of attachment assembly 160 may be set on hinges and may swing into place around both sides of chock track 104. When lock pin 150 and attachment assembly 160 are engaged with chock track 104, attachment assembly 160 may prevent vehicle restraint system 100 from moving in a transverse direction. Attachment assembly 160 may also prevent vehicle restraint system 100 from rotating around mandrel assembly 120. Attachment assembly 160 may also prevent vehicle restraint system 100 from moving in the direction of the axis of the mandrel assembly 160. Thus, in certain embodiments, attachment assembly 160 may prevent mandrel assembly 120 from moving axially, radially, and/or transversely with respect to the mandrel assembly axis.

In certain embodiments, a rotating attachment assembly may be used. A rotating attachment assembly may be lighter, simpler, and/or less expensive than a hinged attachment assembly.

Railway cars may carry vehicles 102 from manufacturing plants to distributors or other shipping lines. Other industrial shipping vessels and containers are also used to transport vehicles 102. Vehicle 102 may be locked in place during any of the above-mentioned shipping methods. For example, vehicle 102 may be locked in place to prevent damage that may be caused to one or more of vehicle 102 itself, the railway car, the railway crew, and/or other items being shipped. Such damage may be caused by vehicle 102 rolling around the inside of the railway car. Further, accidents may occur that cause vehicle 102 and other vehicles on board the railway car to sustain latent damage that may not be found by routine inspection. This latent damage may pose a hidden risk to unknowing consumers who purchase vehicles that have been involved in freight shipping accidents. For example, manufacturers may prefer to replace a damaged fender than to detect and correct structural damage to cars involved in severe shipping accidents.

Certain vehicle restraint systems may secure a vehicle to a rail car with a cantilevered wheel chock. The cantilevered wheel chock may attach to a raised "hat shaped" track (e.g., chock track 104) mounted to the deck of a rail car. The chock track may be located outboard on a side of the vehicle. The chock track may also be attached to the deck of the rail car and/or other transport vehicle, ship, or plane.

Conventional vehicle restraint systems may interface with the raised chock track and attach to it. For example, wheel chocks may straddle the chock track and lock into position using a lock pin that can be placed through a hole or holes in the sides of the chock track, similar to lock pin 150 from FIG. 1. These wheel chocks may secure vehicles to the railcar by chocking both the front and back sides of the wheel. A strap connecting both wheel chocks may then be applied over a portion of the wheel (i.e., over the top of the wheel in the wheel well). The strap may then be tightened in order to secure the vehicle to the deck of the railcar.

Restraining vehicles, such as vehicle 102, using conventional restraint methods may be increasingly difficult due to the popularity of decreased tire to fender clearance ratios in vehicle designs. For example, certain vehicle manufacturers may produce new lines of cars that have a decreased front fender to front wheel clearance ratio. These designs may be popular for reducing drag and improving fuel efficiency. These designs may also be popular with users because of their aesthetic appeal.

Fender to wheel clearance may refer to the distance between any portion of the body of the vehicle and a tire of the vehicle. For example, the front fender may be raised approximately 8 inches off the ground and may be 4 inches from the front of the front-side tires. Fender to wheel clearance may pose a problem for vehicle restraint systems because of the small area provided for inserting a chock and strap system. In the above example, if the top of chock track 104 sits 5 inches off the ground and the front fender is only 8 inches off the ground, the vehicle restraint system may have only 3 inches of clearance before making contact with the bottom of the front fender of vehicle 102. Thus, vehicle restraint systems sitting on top of chock track 104 may contact the bottom of the front fender of vehicle 102. This may prevent the vehicle restraint system from functioning properly, and may damage the bottom of the front fender of vehicle 102.

Restraining vehicles with low fender to wheel clearance ratios, such as described above, may be difficult using conventional vehicle restraint techniques because existing systems have components within the body of the wheel chock. This may require a higher chock body profile due to the size of the interior components. For example, some chocks may have a mandrel inside the body of the wheel chock. The mandrel may need to be positioned at least high enough to clear the chock track. Thus, it may not be possible to secure certain vehicles using existing wheel chocks.

Additionally, traditional wheel chocks may lift up towards the fender and wheel during tightening processes. For example, the lock pin may be smaller in diameter than the track hole, which may allow the wheel chock to move during normal tightening procedures. This may cause the wheel chock to hit the fender and cause damage to the vehicle.

Furthermore, conventional vehicle restraint techniques may employ a key to turn a locking pin to tighten a strap around a tire of a vehicle. In some configurations, the locking pin may be difficult to access, which may result in the vehicle not being secured properly or tightly. Additionally, an operator may be injured when trying to access the locking pin with the key if the locking pin if difficult to access. In some instances, an operator may lose the key, which cause the operator to not be able to secure vehicles altogether. Lastly, the key may sometimes contact vehicles and damage the vehicles.

In certain embodiments, the teachings of the present disclosure may enable one of ordinary skill in the art to prevent and/or mitigate the risks of damaging vehicles during installation of wheel chocks. The teachings of the present disclosure may further enable cars with low clearance levels around the lower portion of their wheels to be properly secured. Moreover, this disclosure contemplates a mechanism that can secure a vehicle to a rail car without needing to use a key.

In certain embodiments, vehicle 102 is subject to incidental forces during shipping operations due to one or more of acceleration, deceleration, and coupling with other railway cars. Less frequently, vehicle 102 is subject to more extreme forces during shipping operations due to high impact collisions (e.g., collisions with other railway cars, high-speed coupling, emergency stops, and railway car failure). Such extreme forces may be transferred directly to the suspension of vehicle 102 when vehicle 102 is restrained using industry standard restraints. Such extreme forces may permanently damage the suspension of vehicle 102, often in a manner that is difficult to detect. Vehicle restraint system 100 may be configured to statically restrain vehicle 102 when incidental forces are applied, but may release vehicle 102 once a predetermined force threshold is reached or exceeded. For reasons discussed below in more detail, releasing vehicle 102 once a force threshold is reached or exceeded may reduce hidden suspension damage, wear, and other problems that are caused by such extreme movement in railway cars. In addition, vehicle restraint system 100 may allow for one or more of additional railway car height clearance, retrofitting of various components associated with existing restraint systems, installation, and maintenance.

Figure 2:
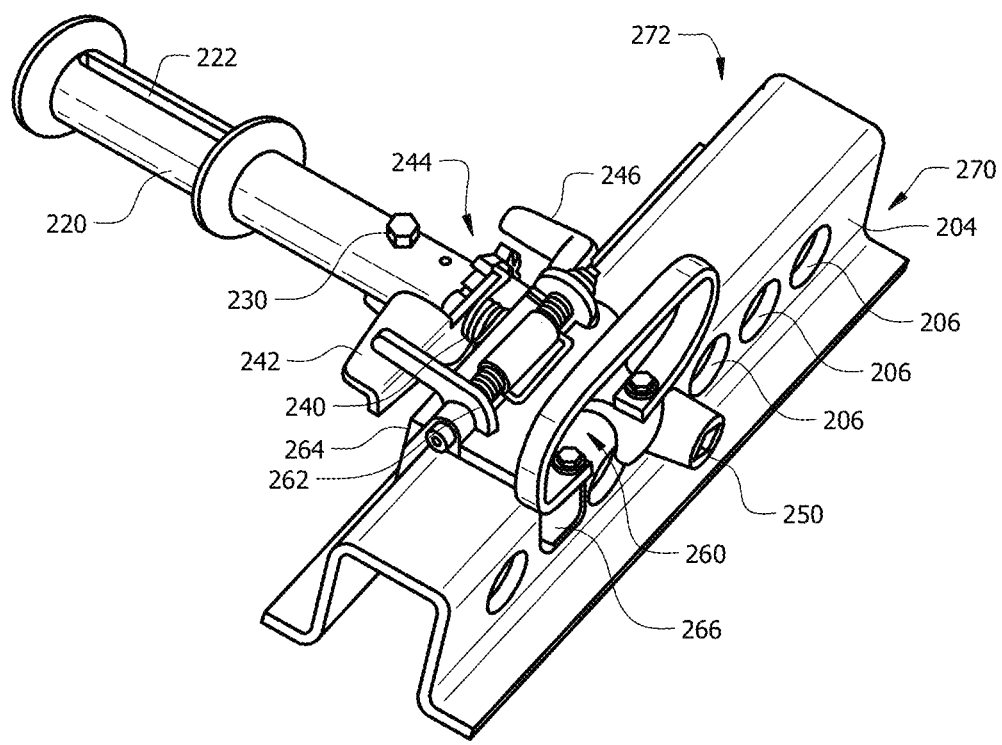
FIG. 2 illustrates a perspective view of a vehicle restraint system, in accordance with certain embodiments.

FIG. 2 illustrates a perspective view of vehicle restraint system 200, in accordance with certain embodiments. A strap assembly belt may feed into a strap assembly receiving section 222 of mandrel assembly 220 such that it may be tightened against a portion of a tire of a vehicle by rotating a lock pin assembly 250 along its axis. For example, lock pin assembly 250 may be coupled to mandrel assembly 220 by a release mechanism 230 and is disposed adjacent to release mechanism 230 and mandrel assembly 220. In certain embodiments, lock pin assembly 250 is part of mandrel assembly 220. In certain embodiments, lock pin assembly 250 is coaxial to mandrel assembly 220. In certain embodiments, the axes of lock pin assembly 250 and mandrel assembly 220 are coaxial.

Release mechanism 230 may be coupled to mandrel assembly 220. Release mechanism 230 is set to relay the tightening force from lock pin assembly 250 to mandrel assembly 220, such that mandrel assembly 220 rotates slack out of the strap assembly to tighten the strap assembly around the portion of the tire of the vehicle. Accordingly, the vehicle may be held in place by the vehicle restraint system. A strap assembly belt may be composed of one or more of nylon, rubber, and cloth.

In certain embodiments, the vehicle restraint system may be an anchor chock. For example, the vehicle restraint system may include only mandrel assembly 220 lock pin 250 and attachment assembly 260. The anchor chock may not have any tightening functionality. Rather, the anchor chock may hold the strap assembly at a fixed position so that the strap assembly may be tightened around a portion of the tire on an opposite side of the tire of the vehicle.

In certain embodiments, the anchor chock may be locked in position by engaging lock pin 250 in a hole 206 of chock track 204. Attachment assembly 260 may rotate on its hinges over the top of chock track 204 in order to prevent the anchor chock from transverse or rotational movements. The anchor chock may be positioned behind the tire, and the strap assembly may be secured to the anchor. The strap assembly may then be tightened against the tire using the mandrel assembly 220.

In certain embodiments, a primary chock may include the chock illustrated in FIG. 2. For example, the primary chock may include mandrel 220, release mechanism 230, winch 240, lock pin 250, and attachment assembly 260. The primary chock may be positioned on an opposite side of a tire as the anchor chock. The primary chock may include tightening functionality. For example, the primary chock may receive a rotational force at a first end of lock pin 250 that extends beyond chock track 204. Lock pin 250 may transmit the rotational force through release mechanism 230 to strap receiving section 222 of mandrel 220. The rotational force causes strap receiving section 222 to rotate and tighten the strap assembly around a portion of the tire.

Release mechanism 230 may include a mandrel coupling rod and a release threshold mechanism. In certain embodiments, the mandrel coupling rod is disposed adjacent to the lock pin on one side. The mandrel coupling rod is disposed adjacent to the mandrel assembly on another side and is coupled to the mandrel assembly. The mandrel coupling rod includes a collar with an interior diameter greater than an exterior diameter of the winch assembly. The mandrel coupling rod and the lock pin assembly are disposed adjacent to each other and are configured such that the collar of the mandrel coupling rod covers an end of the lock pin assembly. The mandrel coupling rod and the lock pin assembly are coaxially disposed, such that a rotating axis of the mandrel coupling rod and a rotating axis of the lock pin assembly are disposed substantially inline. The mandrel coupling rod allows winch assembly 240 to be disposed outside the envelope of the vehicle, which provides unobstructed access for manual operation when tightening and releasing the strap assembly while loading and unloading vehicles from the shipping car. As used herein, "envelope" of a vehicle refers to an outer boundary around the exterior portion of the vehicle.

Release mechanism 230 may have a predetermined release threshold. In particular embodiments, the release threshold is based on the modulus of a shear pin. The shear pin may include one or more of a rod and a bolt inserted radially through shear pin holes formed in the mandrel coupling rod and the lock pin assembly. In particular embodiments, both the collar of the mandrel coupling rod and the end of the lock pin assembly include shear pin holes through which the shear pin may be inserted and engaged. When the shear pin is engaged, the mandrel coupling rod and the lock pin assembly may be coupled together. A force is transmitted from lock pin assembly 250 through mandrel assembly 220 to the strap assembly. When the shear pin is broken (e.g. with a shearing force), or otherwise disengaged from at least one of lock pin assembly 250 and mandrel assembly 220, the mandrel coupling rod and the lock pin assembly decouple and mandrel 220 may release a tension applied to the strap assembly. One or more of the thickness and strength of the rod of the shear pin may be changed to obtain a particular release threshold (e.g. breakaway, shearing, or release strength).

For example, a ⅛ inch shear pin may be used to restrain a light vehicle during a high impact collision at over 8 mph. The shear pin strength and width may be selected to break during collisions over 6-10 mph. A larger vehicle may require a shear pin with higher strength in order to restrain the vehicle for the same range. In another embodiment, a shear pin is selected such that the shear pin breaks during a collision at over 4 mph.

The shear pin may be replaced to modify the release threshold of the vehicle restraint system. In one example, the shear pin is inexpensive and readily replaced by pressing out the ends of the installed shear pin (e.g. broken or unbroken) and inserting a new shear pin. Release mechanism 230 may include alignment holes formed therein, which are disposed adjacent to the shear pin holes and assist in aligning the shear pin holes of the mandrel coupling rod and the winch assembly.

One or more of other torque limiting, force limiting, and disconnecting devices may be employed in release mechanism 230 in lieu of a shear pin (e.g., a friction plate limiter or ball detent disconnect). Such other devices may employ coupling rods, or, alternatively, may be disposed directly adjacent to one or more of lock pin assembly 250 and mandrel assembly 220. For example, release mechanism 230 may be a friction limiting plate that is disposed between one or more coupling rods in release mechanism 230 and may be coupled to an end of each of the one or more coupling rods. Extreme forces produced while transporting vehicles are dissipated by one or more of the torque limiting, force limiting, and disconnecting devices, which allow the strap assembly to loosen.

Certain configurations may not employ coupling rods, but may employ a torque limiting device directly between mandrel assembly 220 and lock pin assembly 250. Further configurations may include magnetic based torque limiting devices. Still other configurations may include torque limiting devices that give way, but do not break or shear when the predetermined force threshold is reached.

Other embodiments may not include coupling rods in release mechanism 230 or may include a winch coupling rod coupled directly to winch assembly 240 with release mechanism 230 disposed between the winch coupling rod and the mandrel assembly. Another configuration includes release mechanism 230 disposed in any other elements presented in the present disclosure. Any combination of the above examples may be used in connection with the disclosure.

In certain embodiments, vehicle restraint system 100 may include winch 240. Winch 240 may be disposed on mandrel assembly 220 and lock pin assembly 250. Winch gear lock 242 and winch gear teeth 244 may incrementally allow rotation of mandrel assembly and lock pin 250. When winch gear lock 242 is engaged, mandrel assembly 220 may only rotate in one direction (i.e., the tightening direction). Winch gear lock 242 may prevent mandrel assembly 220 and lock pin assembly 250 from releasing the tightening force.

In certain embodiments, winch gear lock 242 may be disengaged from winch gear 244. When winch gear lock 242 is disengaged from winch gear 244, mandrel assembly 220 and lock pin 250 may rotate freely. Thus, the tension force applied to the strap assembly to keep the strap assembly locked in place around the tire of the vehicle may be released by releasing winch gear lock 242.

In certain embodiments, winch gear lock 242 may be released manually by hand. For example, an employee may release winch gear lock 242 with their foot while unloading vehicles from a rail car. In certain embodiments, a special device or tool may be used to release winch gear lock. For example, a wrench or special device including a handle may be used to release winch gear lock 242.

In certain embodiments, winch 240 includes a winch gear guard 246. Winch gear guard 246 may protect tires from contacting moving and/or sharp portions of winch gear 244.

In certain embodiments, attachment assembly 260 includes a base 264, a hinge 262, and a lock tab 266. Attachment assembly is coupled to mandrel assembly 220 and lock pin 250. When lock pin 250 is engaged with chock track 204, attachment assembly 260 may be disposed on a first side of chock track 204.

In certain embodiments, hinge 262 couples lock tab 266 to base 264 of attachment assembly 260. Lock tab 266 may swing over chock track 204. For example, lock tab 266 may rotate around hinge 262 such that lock tab 266 is positioned on a second side of chock track 204. Lock tab 266 may engage a second hole 206 in chock track 204. When lock tab 266 is engaged with chock track 204 and lock pin 250 is engaged with a hole 206 in chock track 204, mandrel assembly 220 may be secured to track assembly 204.

In certain embodiments, attachment assembly 260 may prevent mandrel assembly 220 from moving transverse to the axis of mandrel assembly 220. In certain embodiments, attachment assembly 260 may prevent lock pin 250 from rotating in chock track hole 206. In certain embodiments, attachment assembly 260 may prevent mandrel assembly 220 and lock pin 250 from disengaging chock track hole 206. For example, lock pin 250 may be pushed and/or pulled axially out of chock track 204 hole 206. Attachment assembly 260 may prevent axial movements in the mandrel assembly.

In certain embodiments, attachment assembly 260 includes a handle for engaging and disengaging attachment assembly 260 to and from chock track 204.

The depicted embodiment in FIG. 2 shows merely one type of attachment assembly 260; however, many other configurations are possible. For example, in certain embodiments, a rotating attachment assembly may secure mandrel 220 to chock track 204. Other types of attachment assemblies that prevent mandrel assembly 220 from axial and/or transverse movements may be utilized in addition to and/or in substitution of attachment assembly 260.

Figure 3A:
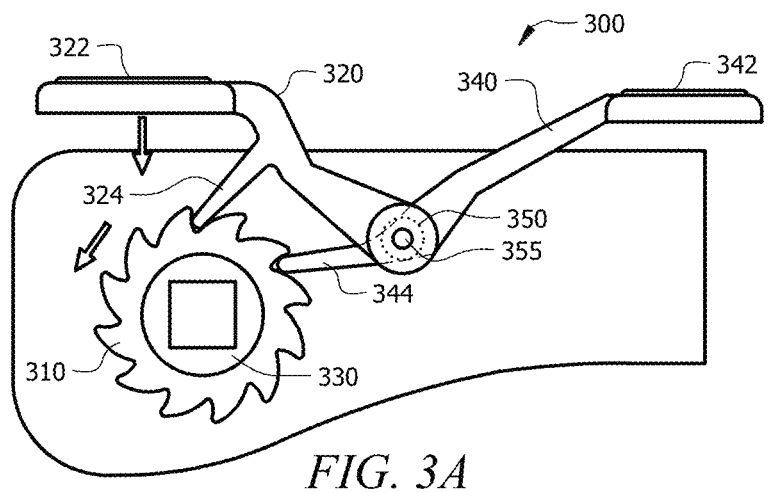
FIGS. 3A and 3B illustrate side views of an example vehicle restraint system with a tensioner, in accordance with certain embodiments.
Figure 3B:
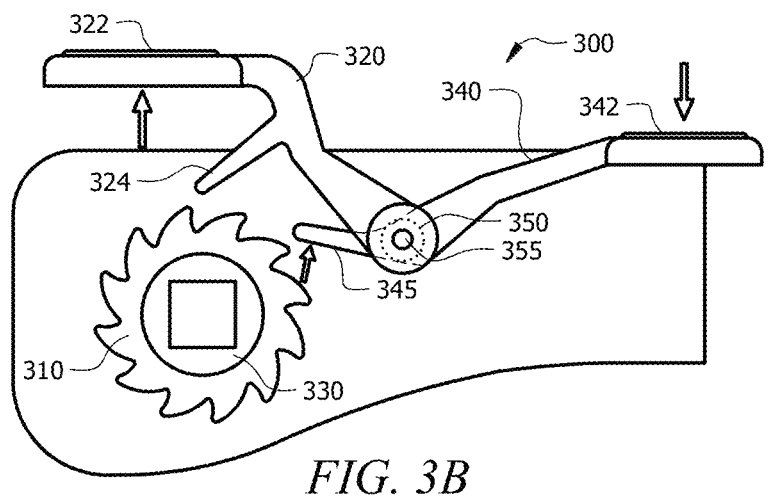

FIGS. 3A and 3B illustrate side views of an example vehicle restraint system 300 with a tensioner 320, in accordance with certain embodiments. Vehicle restraint system 300 may provide an alternative or additional mechanism for rotating mandrel assembly 330. For example, vehicle restraint system 300 may differ from vehicle restraint system 200 with the addition of tensioner 320. Tensioner 320 may be used to rotate mandrel assembly 330 via winch 310. Tensioner 320 may be in addition, or as an alternative, to locking pin 150 or locking pin 250, as described above.

According to certain embodiments, vehicle restraint system 300 includes winch 310 coupled to mandrel assembly 330, tensioner 320, and locking mechanism 340. Rotation of winch 310 may be coupled to rotation of mandrel assembly 330 similar to that described above in reference to winch 240 and mandrel assembly 220. In certain embodiments, tensioner 320 includes pedal 322 and advancer 324. Pedal 322 (which may also be referred to as a tensioning pedal) may extend out from underneath the vehicle, such as from under vehicle 102 such that pedal 322 is accessible to an operator. Pedal 322 may be pressed on, e.g., by an operator's foot, to cause winch 310 to advance, thereby rotating mandrel assembly 330. For example, pressing downward on pedal 322 (e.g., pushing pedal 322 towards winch 310) may cause tensioner 320 to rotate about an axis, such as around shaft 355. The rotation may cause advancer 324 to engage sprockets of winch 310 and provide a rotational force to winch 310. As a result, pressing down on pedal 322 of tensioner 320 may cause the rotation of winch 310 and thereby the rotation of mandrel assembly 330. In certain embodiments, tensioner 320 may be operated to secure a vehicle to a track, e.g., vehicle 102 to chock track 104. For example, mandrel assembly 330 may be coupled to a strap assembly, such as a belt disposed over a tire of a vehicle. Accordingly, repeatedly pressing down on pedal 322 may cause the strap assembly to tighten around the tire, thereby securing the vehicle on the track. In this manner, an operator may secure a vehicle inside a railcar or other shipping container without the need of a separate tool, such as a key or wrench to engage locking pin 150 or locking pin 250. In this manner, a vehicle can still be secured to a rail car even when key or wrench is lost. Additionally, damage to the vehicles caused by the key or wrench may be prevented. Furthermore, operator injury may be avoided when the lock pin is difficult to reach. Lastly, vehicles may be secured properly when the lock pin is difficult to reach.

In certain embodiments, locking mechanism 340 may include a pedal 342 and a locking pawl 344. Locking mechanism 340 may pivot about an axis. For example, locking mechanism may pivot about shaft 355. In certain embodiments, locking mechanism 340 may be pivoted such that locking pawl 344 engages winch 310. For example, locking pawl 344 may be positioned between sprockets of winch 310. In this manner, locking mechanism 340 may be operated to prevent the rotation of winch 310, thereby preventing rotation of mandrel assembly 330. In some embodiments, locking pawl 344 only prevents rotation of winch 310 in one rotational direction. For example, in the illustrated example in FIG. 3A, locking pawl 344 may prevent rotation of winch 310 in the clockwise direction. In this manner, winch 310 may still be rotated in the opposite direction even if locking pawl 344 is engaged. For example, tensioner 320 may be used to advance winch 310 in the counterclockwise direction even when pawl 344 of locking mechanism 340 is proximate the sprockets of winch 310. As a result, when engaged, locking mechanism 340 may only allow mandrel assembly 330 to move in a tightening direction via tensioner 320.

In certain embodiments, locking mechanism 340 and tensioner 320 share a rotation axis. For example, in some embodiments, both locking mechanism 340 and tensioner 320 rotate about shaft 355.

In certain embodiments, locking mechanism 340 and tensioner 320 are coupled by a torsion spring 350. Torsion spring 350 may be configured to resist the rotation of locking mechanism 340 relative to the rotation of tensioner 320, and vice versa. For example, when tensioner 320 is caused to rotate counterclockwise, torsion spring 350 may exert a rotational force against locking mechanism 340 in the same counterclockwise direction. As another example, when locking mechanism is caused to rotate clockwise, e.g., the operator steps on pedal 342 to release the strap assembly, torsion spring 350 may cause advancer 324 of tensioner 320 to move away from winch 310. This may allow winch 310 and mandrel assembly 330 to rotate in the clockwise direction, which may aid in loosening a strap assembly around a tire of a vehicle. Thus, torsion spring 350 may be included to better facilitate the respective functions of tensioner 320 and locking mechanism 340 by coupling their movements through torsion spring 350.

FIG. 3B illustrates vehicle restraint system 300 as locking mechanism 340 is disengaged. When unloading a vehicle, an operator may remove the strap assembly that has been tightened around the tire of the vehicle. To loosen of the strap assembly, mandrel assembly 330 and winch 310 may be rotated in the opposite direction than when used to tighten the strap assembly. For example, winch 310 may be rotated in the clockwise direction to loosen the strap assembly. As discussed above, locking pawl 344 of locking mechanism 340 may prevent such rotation of winch 310. However, an operator may cause locking pawl 344 to disengage by pressing down on pedal 342 (e.g., by pressing pedal 342 downwards towards winch 310 (i.e., such that pedal 342 is closer to winch 310 even though the downwards force is not directly towards winch 310)) of locking mechanism 340. Locking mechanism 340 may pivot about shaft 355 and lift locking pawl 344 away from the sprockets of winch 310. Winch 310 may then be able to rotate in the clockwise direction.

In certain embodiments, pressing down on pedal 342 of locking mechanism 340 may cause tensioner 320 to also rotate. For example, a coupling mechanism, such as torsion spring 350, may be provided between locking mechanism 340 and tensioner 320 such that pressing down on locking mechanism 340 causes tensioner 320 to lift up, thereby moving advancer 324 away from the sprockets of winch 310. As a result, winch 310 may be rotated without interference from either locking pawl 344 or advancer 324.

Figure 4:
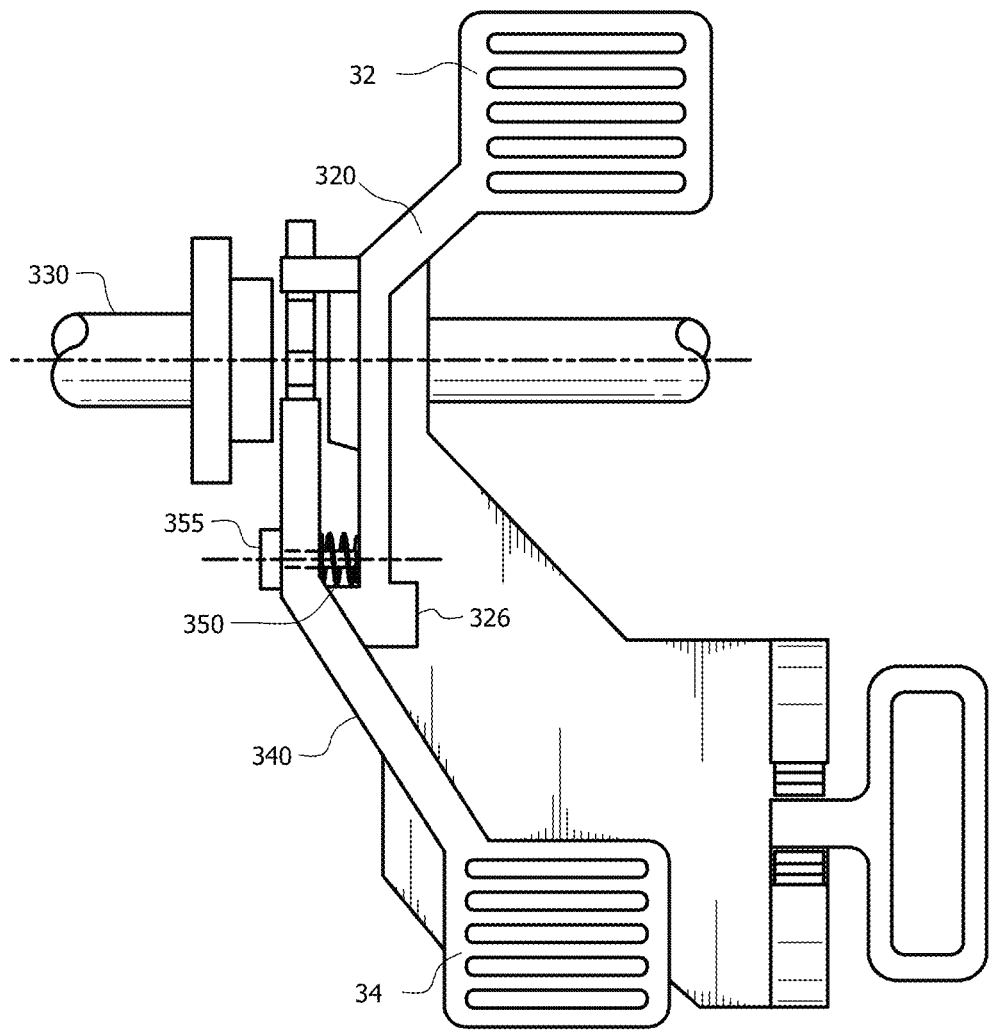
FIG. 4 illustrates a top-down view of the example vehicle restraint system of FIGS. 3A and 3B, in accordance with certain embodiments.

FIG. 4 illustrates a top-down view of vehicle restraint system 300, in accordance with certain embodiments. As shown in this view, pedals 322 and 342 of tensioner 320 and locking mechanism 340, respectively, extend out away from mandrel assembly 330. In this manner, pedals 322 and 342 are accessible by an operator to tighten or loosen a strap assembly around a tire of a vehicle. As described above, the operator may repeatably press down on pedal 322 of tensioner 320 to advance winch 310 and rotate mandrel assembly 330. The operator may press down on pedal 342 of locking mechanism to disengage locking pawl 344 to allow winch 310 to rotate in the opposite direction.

In certain embodiments, tensioner 320 may include lever stop 326. Lever stop 326 may prevent the rotation of tensioner 320 beyond a certain point. For example, pedal 322 of tensioner 320 may be pressed down to advance winch 310 and then lifted up back to its original position, e.g., via a spring force of torsion spring 350. However, if tensioner 320 is lifted further it may contact a portion of the vehicle being restrained or otherwise interfere with the operation within the railcar. Lever stop 326 may then prevent the over rotation and maintain pedal 322 of tensioner 320 below a certain height.

Vehicle restraint systems discussed herein, such as vehicle restrain systems 200 and 300, may be configured to work with anchor chocks and/or belts that are currently available in the field. For example, vehicle restraint systems may be configured with anchor chocks and/or belts that other manufacturers produce. In certain configurations, an existing belt is fed through the mandrel assembly, e.g., mandrel assembly 220 or 330, for restraining tire 106. The existing belt may be used as part of the strap assembly, such as strap assembly 110. Such use may save users of traditional vehicle restraint systems replacement costs by enabling re-use of existing equipment in the vehicle restraint system.

In certain configurations, the vehicle restraint system is configured to use industry standard sized straps. Small straps may be vulnerable to edge tears, abrasion and wear, and may be susceptible to unreliable breaking tolerances. Additionally, required vehicle height clearance may not increase by using the vehicle restraint system because the strap assembly, such as strap assembly 110, may hug the tread of tire 106. For example, because the strap assembly holds the vehicle in place, a high impact collision may not subject the vehicle to roof damage from scraping the top of the transport.

Figure 5:
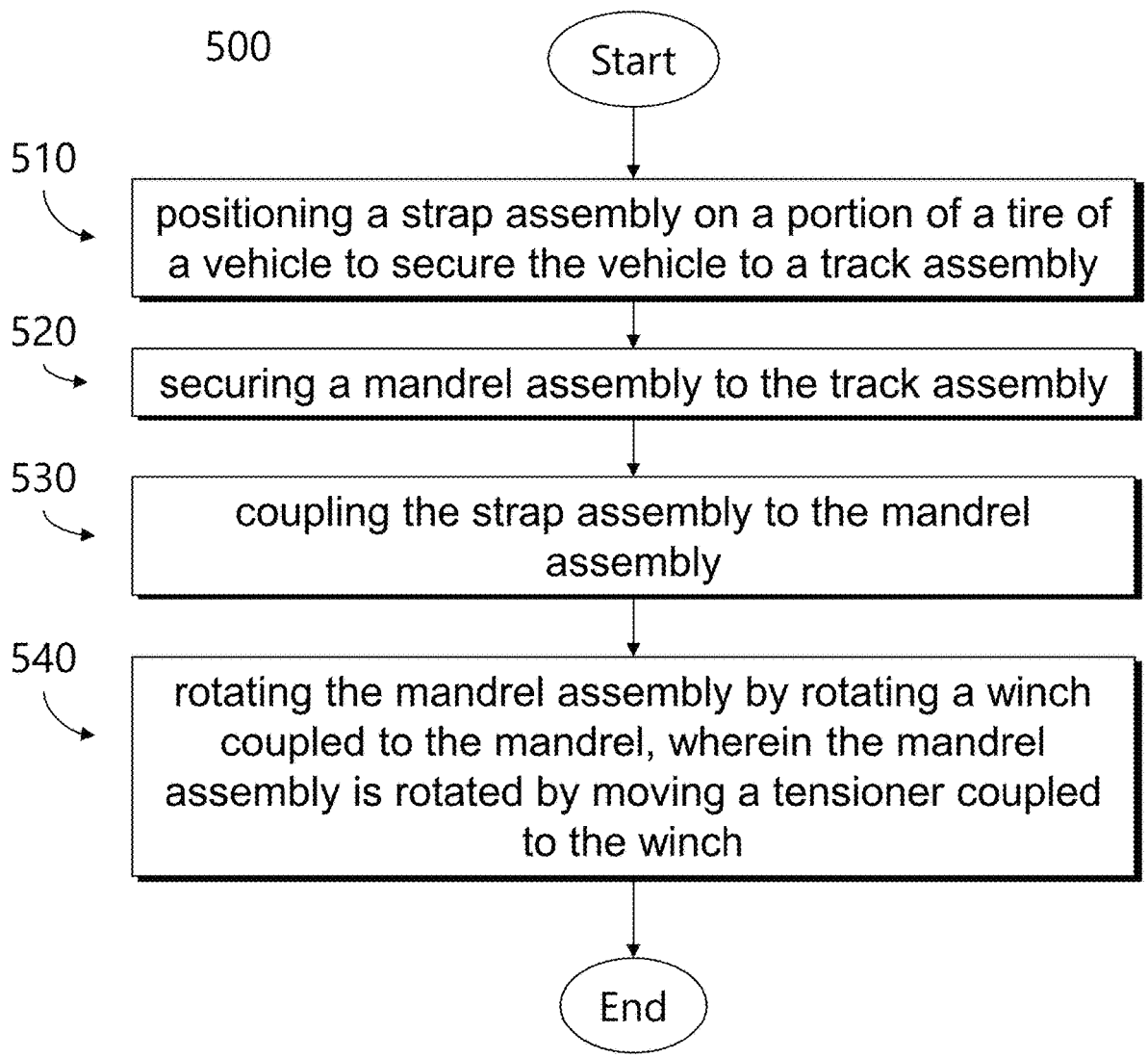
FIG. 5 is a flowchart diagram of an example method of restraining a vehicle in a railway car.

FIG. 5 is a flowchart diagram of an example method of restraining a vehicle in a railway car. Method 500 may begin at step 510, in which a strap assembly is positioned on a portion of a tire of a vehicle to secure the vehicle to a track assembly. For example, a strap or belt may be placed around the circumference of one of the tires of a vehicle. At step 520, a mandrel assembly is secured to the track assembly. For example, the mandrel assembly may be coupled to an attachment assembly that fits over the track assembly. In some embodiments, the attachment assembly is secured along a chock track via a lock tab.

At step 530, the strap assembly is coupled to the mandrel assembly. For example, a portion of the strap or belt may be threaded through a portion of the mandrel assembly. Once the strap assembly is coupled to the mandrel assembly, at step 540, the mandrel assembly may be rotated. The mandrel assembly may be rotated by rotating a winch coupled to the mandrel. The mandrel assembly may be rotated by moving a tensioner coupled to the winch. For example, a pedal of the tensioner may be pressed down to cause the winch to rotate a certain distance. The rotation of the mandrel assembly may be coupled to the rotation of the winch. As the mandrel assembly rotates, the strap assembly, e.g., the strap or belt, may wind around the mandrel assembly, thereby shortening the length of the strap assembly around the tire of the vehicle. The length may be shorted until the tire of the vehicle is secured.

As a result, a vehicle may be restrained by moving a tensioner coupled to the winch of a vehicle restraint system. In some embodiments, the tensioner, such as tensioner 320, may be operated by an operator without any additional tools or equipment. For example, an operator may press down, e.g., using a foot, on a pedal of the tensioner to advance the winch and tighten the strap assembly.

In certain embodiments, method 500 may include additional steps. For example, method 500 may further include the step of disengaging a locking mechanism. The locking mechanism, such as locking mechanism 340, may prevent the rotation of the winch in one direction. By disengaging locking mechanism 340, the winch and mandrel assembly may be rotated in that direction, thereby allowing the loosening of the strap assembly, e.g., to adjust the strap assembly or unsecure the vehicle for removal from the railcar or other shipping container. In this way, a vehicle may be selectively restrained in a railway car.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Modifications, additions, or omissions may be made to the methods described herein without departing from the scope of the disclosure. The methods may include more, fewer, or other steps. Additionally, steps may be performed in any suitable order.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as illustrated by the following example embodiments.

What is claimed is:

1. An apparatus comprising:
    a mandrel assembly configured to be positioned on a first side of a tire of a vehicle and to couple to a track assembly of a rail car;
    an anchor configured to be positioned on a second side of the tire and to couple to the track assembly;
    a strap assembly configured to couple to the mandrel assembly and the anchor and further configured to wrap around the tire;
    a winch coupled to the mandrel assembly, the winch comprising a first sprocket;
    a first pedal;
    an advancer coupled to the first pedal and configured to engage the first sprocket such that, when the first pedal is pushed towards the winch, the advancer pushes the winch such that the winch and the mandrel assembly rotate in a first direction;
    a second pedal; and
    a pawl coupled to the second pedal and configured to engage a second sprocket of the winch such that the pawl prevents the winch from rotating in a second direction, wherein, when the second pedal is pushed downwards, the pawl is configured to disengage the second sprocket such that the winch can rotate in the second direction.

2. The apparatus of claim 1, wherein, when the second pedal is pushed downwards, the advancer is configured to disengage the first sprocket such that the winch can rotate in the second direction.

3. The apparatus of claim 1, wherein the pawl allows the winch to rotate in the first direction when the pawl is engaged with the second sprocket.

4. The apparatus of claim 1, further comprising a spring coupled to the first pedal, the second pedal, the advancer, and the pawl.

5. The apparatus of claim 1, wherein the strap assembly is configured to loosen over the tire when the winch rotates in the second direction.

6. The apparatus of claim 1, further comprising a shearing pin configured to be inserted through the mandrel assembly, the shearing pin further configured to shear when a force is applied to the shearing pin such that the strap assembly is loosened over the tire.

7. The apparatus of claim 1, wherein the strap assembly is configured to tighten over the tire when the mandrel assembly rotates in the first direction.

8. A method comprising:
    positioning a strap assembly on a portion of a tire of a vehicle;
    coupling a mandrel assembly to a track assembly of a rail car on a first side of the tire;
    coupling an anchor to the track assembly on a second side of the tire;
    coupling the strap assembly to the mandrel assembly and to the anchor;
    pushing downward on a first pedal to cause an advancer coupled to the first pedal to engage a first sprocket of a winch coupled to the mandrel assembly and to push the winch such that the winch and the mandrel assembly rotate in a first direction; and
    pushing downward on a second pedal to cause a pawl coupled to the second pedal and engaged with a second sprocket of the winch to disengage the second sprocket such that the winch can rotate in a second direction.

9. The method of claim 8, wherein the pawl prevents the winch from rotating in the second direction when the pawl is engaged with the second sprocket.

10. The method of claim 8, wherein the advancer is configured to disengage the first sprocket such that the winch can rotate in the second direction when the second pedal is pushed downwards.

11. The method of claim 8, wherein the pawl allows the winch to rotate in the first direction when the pawl is engaged with the second sprocket.

12. The method of claim 8, wherein a spring is coupled to the first pedal, the second pedal, the advancer, and the pawl.

13. The method of claim 8, wherein the strap assembly is configured to loosen over the tire when the winch rotates in the second direction.

14. The method of claim 8, further comprising inserting a shearing pin through the mandrel assembly, the shearing pin further configured to shear when a force is applied to the shearing pin such that the strap assembly is loosened over the tire.

15. The method of claim 8, wherein the strap assembly is configured to tighten over the tire when the mandrel assembly rotates in the first direction.

* * * * *